(12) United States Patent
Cirri et al.

(10) Patent No.: US 8,936,722 B2
(45) Date of Patent: Jan. 20, 2015

(54) METHOD AND MACHINERY WITH COMBINED PARTICLE SEPARATION AND FLOW REGULATION DEVICES

(75) Inventors: Massimiliano Cirri, Bayern (DE); Luciano Mei, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 680 days.

(21) Appl. No.: 12/898,223

(22) Filed: Oct. 5, 2010

(65) Prior Publication Data

US 2011/0116918 A1  May 19, 2011

(30) Foreign Application Priority Data

Oct. 12, 2009  (IT) .............................. CO2009A0039

(51) Int. Cl.
*B01D 45/06* (2006.01)
*B01D 45/12* (2006.01)
*F04D 29/056* (2006.01)
(Continued)

(52) U.S. Cl.
CPC ............ *F04D 29/056* (2013.01); *F04D 29/584* (2013.01); *F16C 37/00* (2013.01)
USPC .............. 210/167.32; 210/512.1; 210/167.06; 210/304; 210/175; 210/232; 55/338.1; 55/418.1; 55/468; 55/447; 417/313; 417/89

(58) Field of Classification Search
USPC ........ 210/512.1, 512.3, 532.1, 519, 538, 539, 210/540, 167.01, 167.02, 167.06, 167.08, 210/180, 187, 188, 257.1, 262, 416.5, 210/167.32, 304, 232, 175; 55/338.1, 55/418.1, 468, 447, 338, 406–409, 410, 55/413, 421, 472; 62/470, 908, 67; 60/336, 453, 454, 505, 470, 85; 417/313, 87, 89; 184/104.1; 415/110, 415/111, 112
See application file for complete search history.

(56) References Cited

U.S. PATENT DOCUMENTS 1,871,662 A * 8/1932 Carrier .......................... 415/111
3,907,671 A    9/1975 Baigas, Jr.
(Continued)

FOREIGN PATENT DOCUMENTS

CN           1281100 A    1/2001
CN        101072933 A   11/2007
(Continued)

OTHER PUBLICATIONS

Kim, D.S. et al: "Characterization of a Particle Trap Impactor", Journal of Aerosol Science, vol. 37 (Aug. 1, 2006): 1016-1023.
(Continued)

*Primary Examiner* — David C Mellon
(74) *Attorney, Agent, or Firm* — GE Global Patent Operation (57) ABSTRACT

A method for assembling turbomachinery having combined particle separation device and flow regulating device is provided. The turbomachinery includes a casing; a compressor attached to an inside of the casing, the compressor having a shaft supported by bearings; and a cooling system mounted inside the casing and configured to cool the bearings of the compressor with a cooling fluid. The cooling system includes a particle separation device configured to separate particles from the cooling fluid, and a flow regulation device that fluidly communicates with the particle separation device without contacting the particle separation device. The flow regulation device is disposed adjacent to the particle separation device within a wall of the casing.

14 Claims, 8 Drawing Sheets

(51) Int. Cl.
*F04D 29/58* (2006.01)
*F16C 37/00* (2006.01)

(56) References Cited

U.S. PATENT DOCUMENTS

| | | | |
|---|---|---|---|
| 5,484,521 A | 1/1996 | Kramer | |
| 6,390,789 B1 | 5/2002 | Grob | |
| 7,056,103 B2 * | 6/2006 | LaRue | 417/407 |
| 7,311,741 B2 | 12/2007 | Anderson | |
| 7,478,629 B2 | 1/2009 | Del Valle Facundo et al. | |
| 2005/0193732 A1 | 9/2005 | LaRue | |

FOREIGN PATENT DOCUMENTS

| | | |
|---|---|---|
| EP | 1467104 A1 | 10/2004 |
| EP | 2093866 A1 | 8/2009 |
| FR | 2896101 A1 | 7/2007 |
| JP | 200141191 A | 2/2001 |
| JP | 2005028286 A | 2/2005 |

OTHER PUBLICATIONS

European Search Report and Written Opinion issued in connection with EP Patent Application No. 10187022.8, Jan. 5, 2011.

Unofficial English translation of CN Office Action dated Dec. 4, 2013 from corresponding Application No. 201010517825.2.

Unofficial English translation of Japanese Office Action issued in connection with corresponding JP Application No. 2010-228125 on Sep. 2, 2014.

* cited by examiner

METHOD AND MACHINERY WITH COMBINED PARTICLE SEPARATION AND FLOW REGULATION DEVICES

BACKGROUND OF THE INVENTION

1. Field of Invention

Embodiments of the subject matter disclosed herein generally relate to methods and systems and, more particularly, to mechanisms and techniques for distributing a particle separation device and a flow regulation device for handling a cooling flow in a turbo-machinery.

2. Description of the Prior Art

Figure 1:
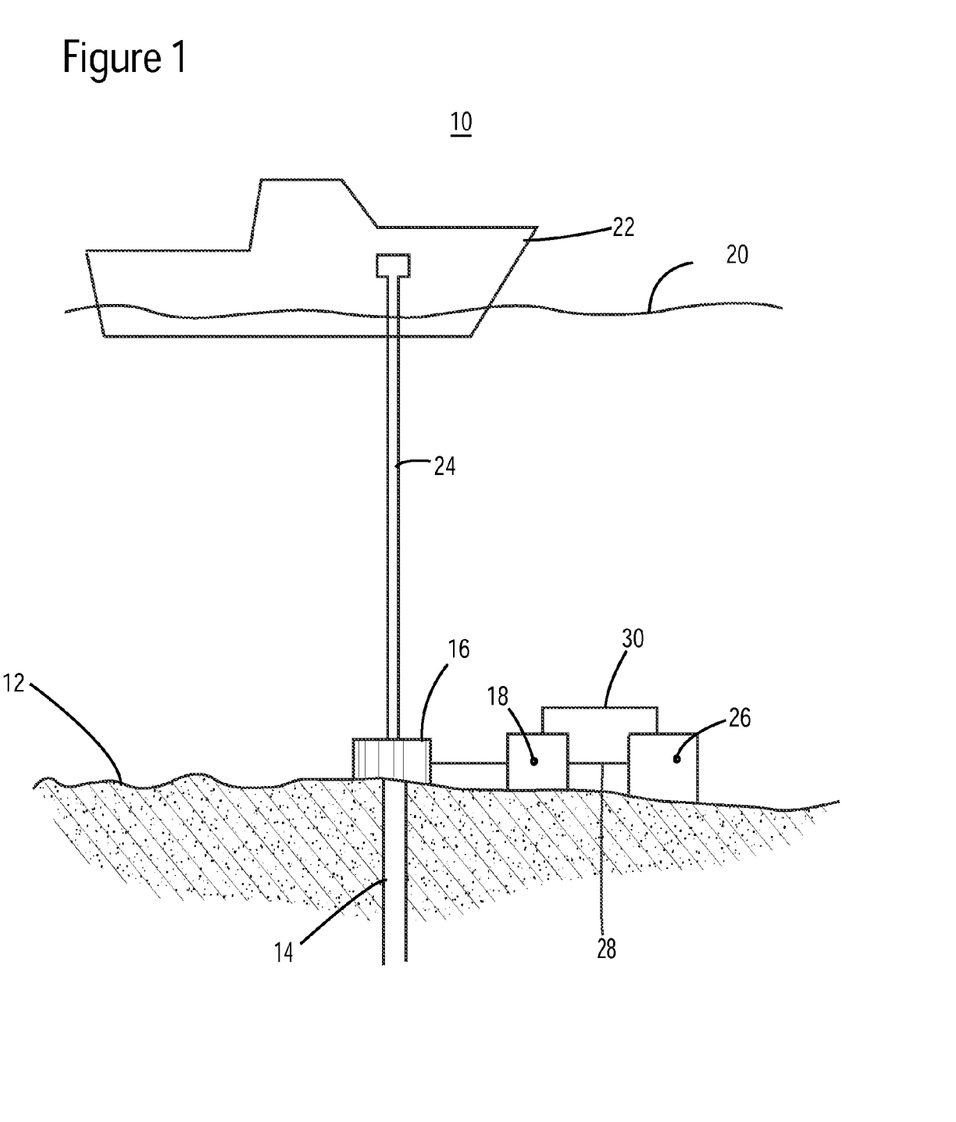
FIG. 1 is a schematic diagram of a conventional offshore oil extraction system.

During the past years, with the increase on the price of fossil fuels, the interest in developing subsea compressors used in sub-sea extraction of the fossil fuel has dramatically increased. As shown in FIG. 1, a sub-sea oil/gas extraction system 10 is partially disposed on the seabed 12, closed to a well 14 from which oil is extracted. The system may include various components 16 (for example, a blowout preventer and other known equipment for maintaining the pressure and the integrity of the well in case of sudden changes in pressure) and a compressor 18 that may be used to pump to the surface 20 the oil/gas extracted from the well 14 such that the oil/gas is collected at a vessel 22 that may float above the well 14. The oil/gas is pumped from the compressor 18 to the vessel 22 through a riser 24. For generating the required pressure for pumping the oil/gas to the surface 20, the compressor 18 is driven by a motor 26, which is directly connected to the compressor 18 via a link 28. However, the bearings supporting the shaft (not shown) of the compressor 18, due to the high rotational speed of the rotor, may develop a significant amount of heat that needs to be removed for a proper operation of the compressor 18. Also, the motor 26 needs to be cooled, as the heat building up in the motor 26 may be significant during operation.

For this reason, compressor 18 may divert a portion of the fluid being compressed (for example, gas from an outlet of the compressor) to cool the bearings of the compressor 18 and parts of the motor 26. The diverted fluid may be split between the compressor 18 and the motor 26 and the part of the diverted fluid that is used to cool down the motor 26 may be supplied by a dedicated pipe 30 from the compressor 18 to the motor 26 as shown in FIG. 1.

However, the diverted fluid may include dirt or foreign particles (impurities) that are undesirable inside the compressor 18 and/or motor 26, especially inside their bearings. For this reason, filters or dust removing devices may be used to clean the diverted fluid prior to cooling the bearings of the compressor 18 and/or the motor 26. Such devices for removing dust and/or particles are disclosed, for example, in U.S. Pat. No. 7,311,741 to Anderson et al., and U.S. Pat. No. 3,907,671 to Baigas, Jr, the entire contents of which are enclosed here by reference.

The system 10 shown in FIG. 1 may include a flow regulation device (not shown) that controls a volume of the fluid supplied to the bearings of the compressor 18 and to the motor 26. Depending on the various conditions under which system 10 is used, this diverted volume of fluid (either to the compressor 18 or to the motor 26) changes from time to time. The flow regulation device is traditionally separated from the dust removing devices as the dust removing devices are placed outside the compressor 18. Further, the traditional flow regulation device is provided deep inside a casing of the compressor 18, a position which is difficult to be accessed from outside.

Thus, in order to modify the flow regulation device in the eventuality of a change in operation of the compressor, the whole compressor 18 has to be disconnected from the seabed 12, brought up to the surface at a dry facility, and then the compressor 18 has to be disassembled such that the flow regulation device can be reached and replaced with another appropriate flow regulation device. Alternatively, the same flow regulation device is maintained, but various removable ring elements having different orifices are provided inside the flow regulation device to alter the flow of the fluid. Once the compressor 18 is disassembled at the dry facility, it takes between half a day and three days for reaching and removing the flow regulation device of the compressor, because of the multiple connections of the flow regulation device to the casing of the compressor and the dust removing device inside or outside the compressor. Thus, maintenance personnel need to reach inside the compressor and detach the flow regulation device from the casing of the compressor and from the particle separation device in order to change it.

This time consuming operation results in the temporary suspension of operations of the oil extraction system 10, which implies loss of production. Thus, it is undesirable to shut down the entire operation of system 10 for two or three days for modifying the flow regulation device depending on the operating conditions of system 10.

Accordingly, it would be desirable to provide systems and methods that avoid the afore-described problems and drawbacks.

SUMMARY OF THE INVENTION

According to one exemplary embodiment, there is a turbo-machinery that includes a casing; a compressor attached to an inside of the casing, the compressor having a shaft supported by bearings; and a cooling system mounted inside the casing and configured to cool the bearings of the compressor with a cooling fluid. The cooling system includes a particle separation device configured to separate particles from the cooling fluid, and a flow regulation device that fluidly communicates with the particle separation device without contacting the particle separation device and configured to regulate the cooling fluid. The flow regulation device is disposed adjacent to the particle separation device within a wall of the casing.

According to another exemplary embodiment, there is a system that includes a casing; a machine attached to an inside of the casing, the machine having a shaft supported by bearings; and a cooling system mounted inside the casing and configured to cool the bearings of the machine with a cooling fluid. The cooling system includes a particle separation device configured to separate particles from the cooling fluid, and a flow regulation device that fluidly communicates with the particle separation device without contacting the particle separation device and configured to regulate the cooling fluid. The flow regulation device is disposed adjacent to the particle separation device within a wall of the casing.

According to still another exemplary embodiment, there is a method for assembling a turbomachinery having a casing. The method includes attaching a compressor to an inside of the casing, the compressor having a shaft supported by bearings and attaching a cooling system to an inside of the casing, the cooling system being configured to cool the bearings of the compressor with a cooling fluid. The cooling system includes a particle separation device configured to separate particles from the cooling fluid, and a flow regulation device that communicates with the particle separation device without contacting the particle separation device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a subsea compressor. However, the embodiments to be discussed next are not limited to these compressors, but may be applied to other compressors or machines that require the supply of a clean fluid flow for cooling purposes.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
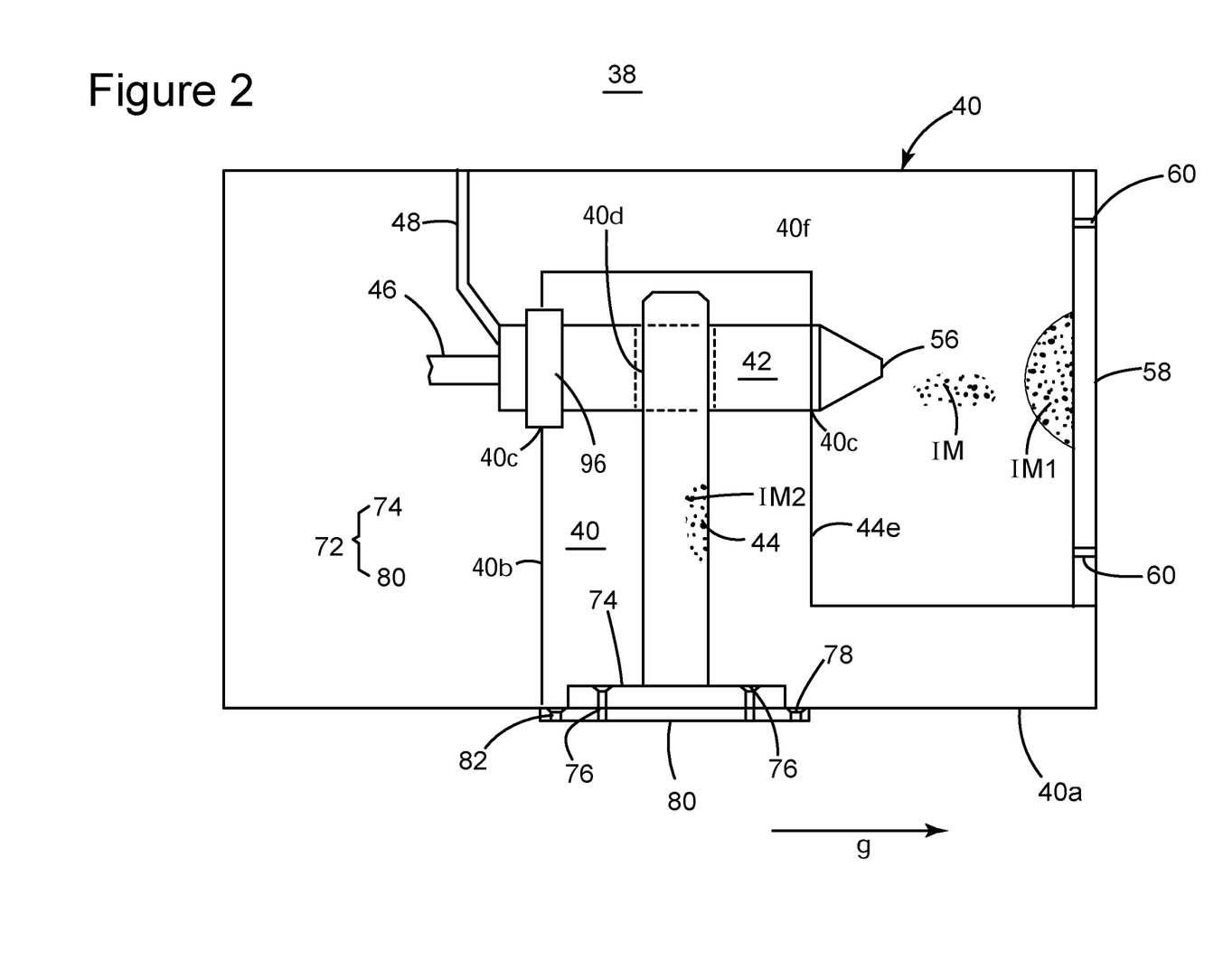
FIG. 2 is a schematic diagram of a compressor according to an exemplary embodiment.

According to an exemplary embodiment shown in FIG. 2, a novel compressor 38 has a casing 40 (partially illustrated in the figure and not at scale) and various components that are known in the art and thus not illustrated. Among components of interest is a particle separation device 42, which is configured to separate dirt/particles from a fluid flow by inertial effect or other principles as would be appreciated by those skilled in the art (see for example, Kim et al., "Characterization of a particle trap impactor," Aerosol Science 37 (2006) 1016-1023, the entire content of which is incorporated herein by reference). Also shown in FIG. 2 is a flow regulation device 44 which fluidly communicates with the particle separation device 42, as will be discussed later. Both the particle separation device 42 and the flow regulation device 44 are partially disposed in holes formed in casing 40, as will be discussed later. The particle separation device 42 has an input 46 via which the fluid flow is diverted from an output of the compressor for cooling down the bearings (not shown) of the compressor 38 and/or the motor 26, which are shown in FIG. 1.

Figure 3:
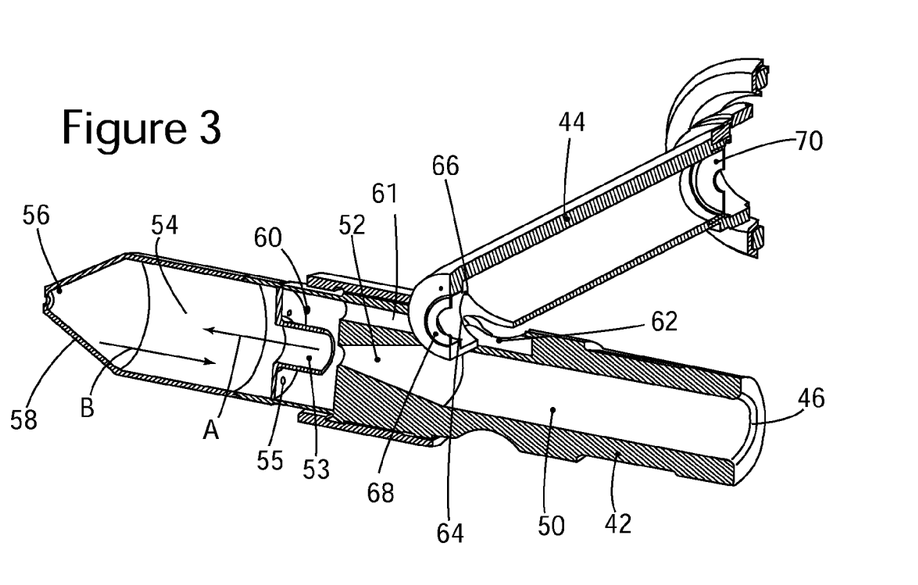
FIG. 3 is a schematic diagram of a particle separation device and a flow regulation device disposed inside the compressor of FIG. 2 according to an exemplary embodiment.

FIG. 2 shows that the particle separation device 42 is attached to a member 48 of the casing 40 or to another component of the compressor 38, as for example a hole 40c in a wall 40b of the casing 40. FIG. 3 shows a more detailed view of the particle separation device 42. More specifically, the diverted fluid enters through input 46 into a first chamber 50 and then the diverted fluid reaches a narrowing passage 52 in which the fluid becomes accelerated together with the particles entrained in the fluid before entering a channel 53 and a second chamber 54. This second chamber 54 has a hole 56 which communicates with an inside of the casing 40 of the compressor 38.

Due to the acceleration of the diverted fluid and the different momentum of the dirt particles and the fluid particles, and the fact that the particles and/or dust illustrated generally as impurities IM in FIG. 2 are heavier than the fluid itself, the flow reverses direction from direction A to direction B (see FIGS. 3 and 5) while most impurities IM maintain their original direction A due to their inertia. Thus, impurities IM are separated from the flow and accumulated close to hole 56 so that they gradually fall out of the particle separation device 42 through the second chamber 54, forming a pile of impurities IM1 inside the casing 40 as shown in FIG. 2.

Returning to FIG. 2, it is noted that the hole 56 of the particle separation device 42 faces a bottom region 58 of the compressor 38. In other words, FIG. 2 shows the compressor 38 lying on a lateral side and not in its operating position. When operating, compressor 38 is arranged such that bottom region 58 is facing/contacting the floor of the facility. This is illustrated by gravity vector g. Therefore, the impurities that accumulate inside the particle separation device 42 fall via hole 56 to the bottom region 58 of the compressor 38. The bottom region 58 of the compressor 38 may be connected by screws 60 or other known mechanisms in the art to the casing 40. The position of the compressor 38 as shown in FIG. 2 is a maintenance position used when the compressor is to be disassembled, i.e., the bottom region 58 is removed for access to the particle separation device 42 and to other components of the compressor 38.

Figure 4:
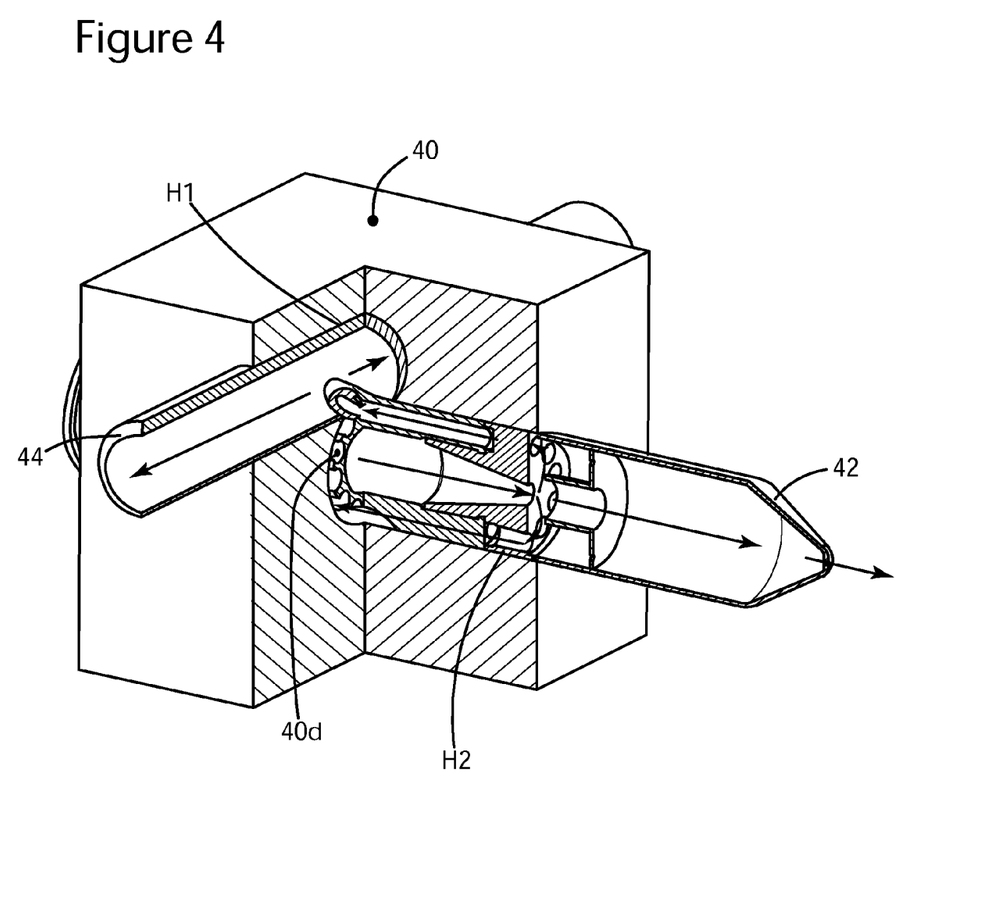
FIG. 4 is a schematic diagram of the particle separation device and the flow regulation device according to another exemplary embodiment.

Returning to FIG. 3, once the diverted fluid flow has changed direction from A to B, the diverted fluid flow enters a third chamber 60 and reaches one or more channels 61. FIG. 3 shows only one channel however, in one embodiment, the particle separation device may have between 2 and 20 channels 61. Due to one or more holes 62 on the side portion of the particle separation device 42 and a corresponding hole 64 of the flow regulation device 44, the diverted fluid flow, which is now cleaned of impurities, enters the flow regulation device 44 into chamber 66. However, because the particle separation device 42 is not in direct contact with the flow regulation device 44, part of the cleaned fluid exiting holes 62 may enter chamber 40d, shown in FIG. 4, prior to entering the flow regulation device 44. Chamber 40d, as shown in FIG. 4, is defined by casing 40, a portion of the particle separation device 42, and a portion of the flow regulation device 44. Cavity 40d may be configured to have two holes H1 and H2 as also shown in FIG. 4.

The two holes H1 and H2 may be arranged so that axes of the holes are substantially perpendicular to each other.

Depending on the application, the angle between the two axes may be different than 90 degrees. In addition, holes H1 and H2 may be have such diameters to tightly receive the particle separation device 42 and the flow regulation device 44 such that a leak of cleaned fluid is prevented. However, in an exemplary embodiment, a leak may occur from chamber 40d. Holes H1 and H2 shown in FIG. 4 correspond to holes 40c shown in FIG. 2. In an exemplary embodiment, a distance between holes H1 and H2 is such calculated that the particle separation device 42 does not touch the flow regulation device 44 when both of these devices are inserted into casing 40. In still another exemplary device, the flow regulation device 44 is inserted such that one end is left outside casing 40 and the other end extends into a chamber 40f (see FIG. 2) formed within casing 40. According to this exemplary embodiment, the end of the flow regulation device left outside casing 40 may be connected with appropriate piping to motor 26 (see FIG. 1). The particle separation device 42 may be disposed such that a middle portion is within a wall of casing 40 while the ends are within chamber 40f. Other arrangements are possible as would be recognized by the skilled in the art.

Still with regard to FIG. 3, the cleaned diverted fluid flow from chamber 66 splits into first and second flows, the first flow exiting hole 68 towards, for example, the bearings of the compressor and the second flow exiting hole 70 towards, for example, the motor 26 shown in FIG. 1. These holes 68 and 70 are predetermined for each flow regulation device 44 and a change in operation of the compressor 38 requires the complete removal of the flow regulation device 44 and replacement with the new flow regulation device or the old flow regulation device but having differently sized holes as will be discussed later. However, because the flow regulation device 44 is not attached to the particle separation device 42, this operation is faster than in conventional devices.

Returning to FIG. 2, the flow regulation device 44 is shown having an interface 72 that includes, among other components, for example, a flange 74 and a flange 80. The mechanism discussed next for attaching the flow regulation device 44 to the casing 40 may also be applied to the particle separation device 42. Flange 74 may be connected via, for example, screws 76 to flange 80, which is part of the interface 72. Flanges 74 and 80 cover a hole 78 formed on the side 40a of the casing Hole 78 in the side 40a of the compressor 38 may be sized to allow the removal of the entire flow regulation device 44 without opening the bottom region 58 of the compressor 38. Flange 80 may be attached with screws 82 to side 40a of casing 40. Other mechanism may be used to secure the flow regulation device 44 to the side 40a of casing 40 as would be appreciated by those skilled in the art.

FIG. 4 shows an overall view of the particle separation device 42 and the flow regulation device 44 in which, although the flow regulation device 44 is provided adjacent to the particle separation device 42, there is no mechanical connection, i.e., bolts, screws, or other attaching devices for connecting together the particle separation device 42 to the flow regulation device 44. A set of arrows are indicative of the fluid flow through the particle separation device 42, chamber 40d and the flow regulation device 44 and also of the flow of dirt particles through the particle separation device 42 Therefore, with regard to FIG. 2, when the compressor 38 is at a dry facility and the flow regulation device 44 has to be changed for various purposes, it could be that the bottom region 58 of the compressor 38 does not have to be removed but only flange 80 on side 40a of casing 40 has to be removed together with the flow regulation device 44. This operation can be performed from outside the compressor 38 because of the easy access via flange 80 to the flow regulation device 44. In this way, the replacement of the flow regulation device 44 with another one or the change of the holes 68 and 70 may reduce the replacing time from 12 to 48 hours to 2 to 3 hours as only a couple of bolts 82 need to be removed in order to remove the flanges 74 and 80 and the flow regulation device 44.

This reduced access time for modifying/changing the flow regulation device 44 may be achieved, according to an exemplary embodiment, by having the flow regulation device 44 connected only to a side 40a of the compressor 38 via interface 72 and by not mechanically connecting the flow regulation device 44 to the particle separation device 42 although placing the two devices adjacent to one another. Here, it is understood by the expression "not mechanically connecting" the flow regulation device 44 to the particle separation device 42 that no bolts, screws, or other mechanical means are used to attach these two devices to each other. However, this expression does not exclude direct contact between the two devices or interlocking of the two devices. In this regard, FIGS. 3 and 4 show that the particle separation device 42 is fluidly connected to the flow regulation device 44, as the holes 62 of the particle separation device 42 communicate with the hole 64 of the flow regulation device 44.

Figure 5:
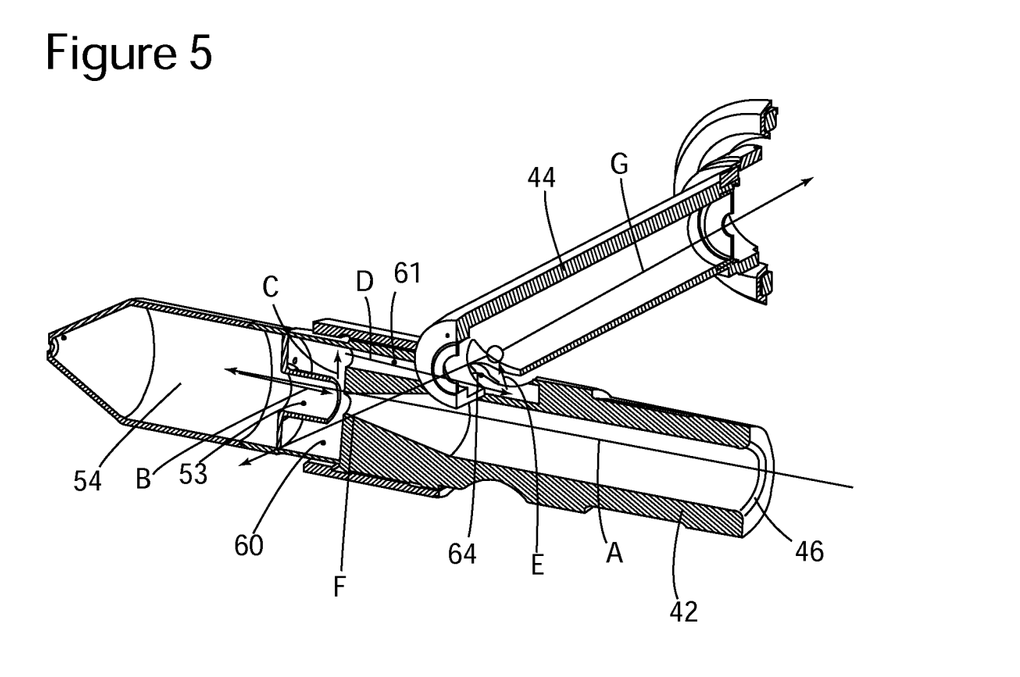
FIG. 5 is a schematic diagram illustrating the flow path through the particle separation device and the flow regulation device according to an exemplary embodiment.

The flow path through the particle separation device 42 and the flow regulation device 44 is shown in more detail in FIG. 5. According to this exemplary embodiment, the diverted fluid flow from the compressor 38 enters the particle separation device 42 at inlet 46 and moves along the direction of arrow A to the second chamber 54 and/or directly along arrow C to channels 61 without traversing channel 53. FIG. 4 shows that plural channels 61 may be disposed around channel Part of the fluid flow may follow direction A and after interacting with walls 58 of the second chamber 54 changes its direction as shown by arrow B and returns in the third chamber 60 of the particle separation device 42. From this chamber, the cleaned fluid flow follows arrow C and arrow D to channels 61. Channels 61 of the particle separation device 42 communicate with chamber 40d and then with hole 64 of the flow regulation device 44 and the fluid flow follows arrow E into the flow regulation device 44. Here, the fluid flow splits and a part of it follows arrow F to the bearings of compressor 38 and the remaining part of the fluid flow follows arrow G towards motor 26. An example of a fluid that is handled by the flow regulation device 44 may be any gas used and/or produced in the petrochemical industry, or in the oil and gas industry. Other gases and liquids may also be used with the novel systems discussed herein.

An advantage of one or more of the exemplary embodiments discussed above is now explained with regard to FIGS. 3 and 5. FIG. 3 shows that the cleaned fluid flow is provided in chamber 66 of the flow regulation device 44 from the particle separation device 42. At this stage, the cleaned fluid flow may still contain impurities, depending of the efficiency of the particle separation device 42. These impurities IM2 (dust, foreign particles, etc.) which are shown in FIG. 2 may accumulate with time in chamber 66 (see also FIG. 2) of the flow regulation device 44. The flow regulation device 44 may handle a predetermined amount of impurities IM2. However, a larger amount of impurities would affect the operation of the flow regulation device 44, for example, reducing a fluid flow, which may result in damage of the bearings of the compressor or damage to the motor 26 for lack of proper cooling.

Thus, for preventing these problems, according to an exemplary embodiment, the flow regulation device 44 may be easily removed from the compressor 38 without disassembling the entire compressor, and checked for impurities. A large amount of impurities IM2 (see FIG. 2) in the flow regulation device 44 also suggests an even larger amount of impurities IM1 at the bottom region 58 of the compressor 38. Thus, the removal of the flow regulation device 44 "tells" maintenance personnel when to disassemble the compressor 38 (i.e., remove bottom region 58), which is a time consuming operation. In other words, the ability to quickly inspect the flow regulation device 44 may delay the need to disassemble the compressor 38.

Figure 6:
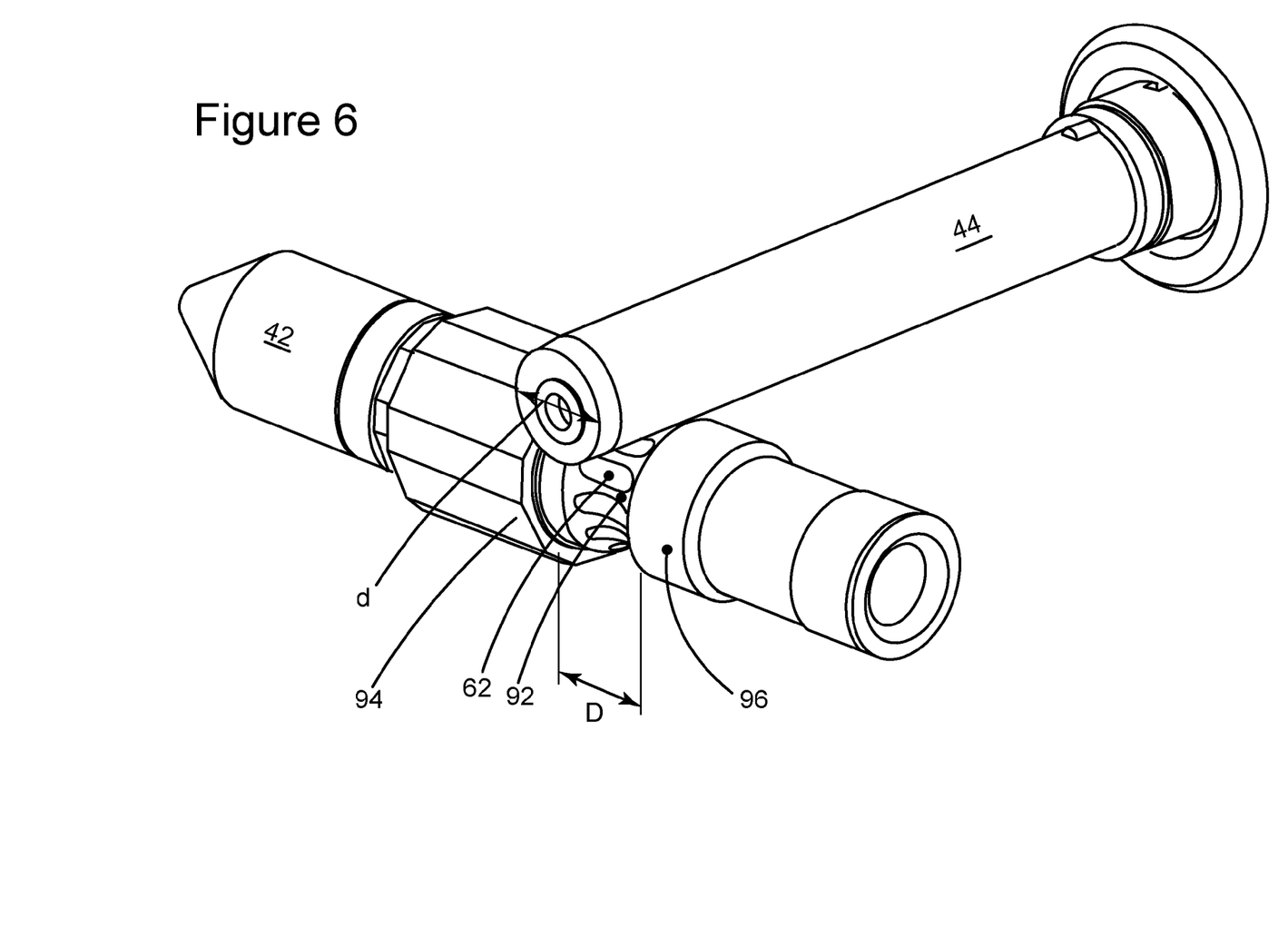
FIG. 6 is a schematic diagram illustrating a contact between a particle separation device and a flow regulation device according to an exemplary embodiment.

Next, it is discussed how the flow regulation device 44 is mated with the particle separation device 42 after the two devices have been detached from the casing 40. As already discussed above, the flow regulation device 44 has to be changed from time to time depending on the operation of the compressor 38. After the existing flow regulation device 44 has been removed, it is assumed in this example that the same flow regulation device 44 has to be reinstalled. FIG. 6 shows the particle separation device 42 having one or more holes 62 separated by flat surfaces 92. These elements 62 and 92 are formed on the particle separation device 42 between specific regions 94 and 96, which accommodate the flow regulation device 44. A distance D separating the specific regions 94 and 96 is equal to or larger than an external diameter d of the flow regulation device 44. Also, regions 94 and 96 may have a higher diameter (elevation) than a region of the particle separation device 42 that is sandwiched by these two regions (i.e., region defined by holes 62 and flat surfaces 92). The higher diameter regions 94 and 96 may be used to seal chamber 40d when the particle separation device 42 is introduced in corresponding whole H1, as shown in FIG. 4.

In an exemplary embodiment, the particle separation device 42 does not touch the flow regulation device 44. This feature may be achieved by attaching these devices to predetermined holes, brackets, flanges or other attaching mechanisms that are fixed to casing 40. For example, hole 80 in FIG. 2 and member 48 may be positioned in casing 40 so that when devices 42 and 44 are attached to them, devices 42 and 44 are in the correct positions shown in FIGS. 6 and 7 without touching each other. Alternatively, device 42 may be attached to one or more holes H1 formed in a wall 40b and/or a wall 40e of casing 40, similar to device 44. Thus, axes of holes H1 and H2 may be positioned relative to casing 40 for achieving an accurate alignment of devices 42 and 44. In one exemplary embodiment, the axes of holes H1 and H2 are substantially perpendicular to each other.

Figure 7:
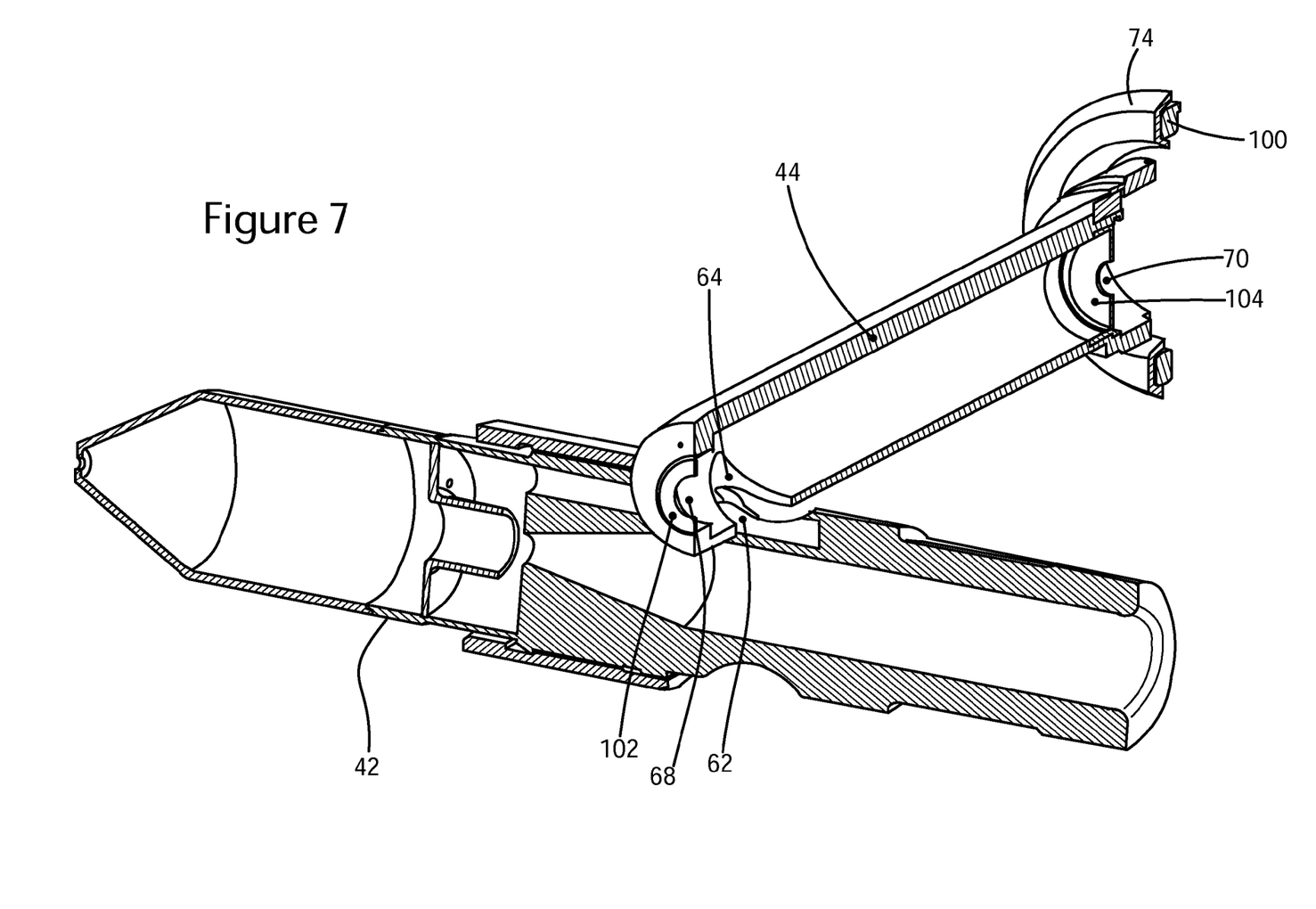
FIG. 7 is a schematic diagram illustrating a sectional view of the contact of FIG. 6 according to an exemplary embodiment.

According to an exemplary embodiment and as shown in FIGS. 6 and 7, although device 42 has plural holes 62, only a few of the holes 62 directly face device 44. In other words, the clean fluid from device 42 exits through holes 62 into chamber 40d of casing 40 and from there, the clean fluid enters device 44 via one or more holes 64. Thus, devices 42 and 44 may be independently removed from cavity 40 for maintenance purposes.

FIG. 7 also shows a gasket 100 that may be placed in a groove in flange 74 for ensuring a leakage free closing of hole 78 in the side 40a of the casing 40 of the compressor 38 (see FIG. 2). In addition, FIG. 7 shows a first ring element 102 that has the hole 68 (second hole) and a second ring element having hole 70 (third hole). According to an exemplary embodiment, the first and second ring elements 102 and 104 are removably attached to the flow regulation device 44 and by simply changing these elements the fluid flow to the bearings and the motor may be adjusted as desired.

Figure 8:
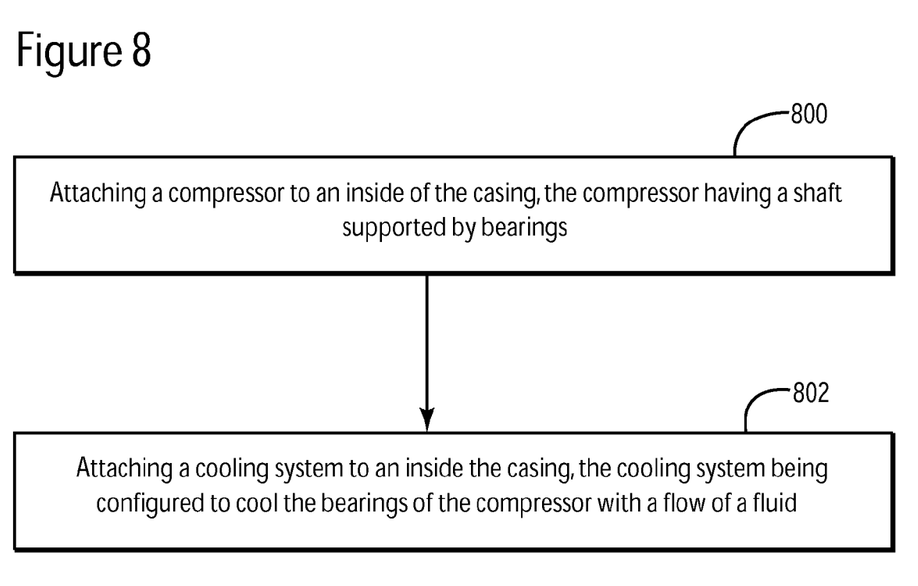
FIG. 8 is a flow chart illustrating steps for assembling a flow-regulating device according to an exemplary embodiment.

According to an exemplary embodiment illustrated in FIG. 8, there is a method for assembling a turbo-machinery having a casing. The method includes a step 800 of attaching a compressor to an inside of the casing, the compressor having a shaft supported by bearings and a step 802 of attaching a cooling system to the inside of the casing, the cooling system being configured to cool the bearings of the compressor with a flow of a fluid. The cooling system includes a particle separation device configured to separate particles from the fluid flow, and a flow regulation device that fluidly communicates with the particle separation device without touching the particle separation device and configured to regulate the flow of the fluid.

Alternative or additional steps for the method discussed above include one or more of attaching the flow regulation device with a first end region to the casing; maintaining the flow regulation device not connected by any mechanical means to the particle separation device; fluidly communicating at least a first hole of the flow regulation device with one or more holes of the particle separation device to receive the cooling fluid; directing a part of the cooling fluid through a second hole to the bearings of the compressor; directing a remaining part of the cooling fluid through a third hole to a motor; and/or adding an interface to the flow regulation device to be connected to a side opening of the casing by a retaining mechanism.

The turbomachinery discussed in the above embodiments may have the flow regulation device with an interface configured to be connected to a side opening of the casing by a retaining mechanism. Alternatively, a retaining mechanism of the turbomachinery is a bolt or a screw and the interface is a flange. Still another possibility for the turbomachinery is to have the flow regulation device configured to be removed from the casing by only removing the interface.

The disclosed exemplary embodiments provide a method and system for easily modifying a flow regulation device provided in the system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A turbo-machinery comprising:
    a casing;
    a compressor attached to an inside of the casing, the compressor having a shaft supported by bearings; and
    a cooling system mounted inside the casing and configured to cool the bearings of the compressor with a cooling gas, the cooling system comprising:

an inertial separator configured to separate particles from the cooling gas, and a flow regulation device that fluidly communicates with at least a first hole of the inertial separator to receive the cooling gas without touching the inertial separator and configured to regulate the cooling gas, wherein the flow regulation device is disposed adjacent to the inertial separator within a wall of the casing;

wherein the flow regulation device is removable from the compressor using at least one flange and comprises:

a first ring element having a second hole and being configured to be attached to a first end of the flow regulation device; and a second ring element having a third hole and being configured to be attached to a second end of the flow regulation device.

2. The turbo-machinery of claim 1, wherein parts of the inertial separator and the flow regulation device are provided within the wall of the casing such that holes formed in the parts fluidly communicate to each other.

3. The turbo-machinery of claim 2, wherein the flow regulation device has a first end region that is attached to the casing and a second end region that faces the inertial separator without contacting the inertial separator and a chamber is formed within the wall of the casing between inertial separator and the flow regulation device.

4. The turbo-machinery of claim 3, wherein the chamber is sealed by the inertial separator and the flow regulation device such that most of the cooling gas is not leaked.

5. The turbo-machinery of claim 1, wherein the inertial separator is provided in a first aperture in the casing and the flow regulation device is provided in a second aperture in the casing such that the inertial separator does not contact the flow regulation device.

6. The turbo-machinery of claim 1, wherein the first hole fluidly communicates with one or more holes of the inertial separator to receive the cooling gas, the second hole directs a part of the cooling gas to the bearings of the compressor and the third hole directs a remaining part of the cooling gas to a motor.

7. The turbo-machinery of claim 6, wherein a diameter of the second hole is different from a diameter of the third hole.

8. A system comprising:

a casing;

a machine attached to an inside of the casing, the machine having a shaft supported by bearings; and a cooling system mounted inside the casing and configured to cool the bearings of the machine with a cooling gas, the cooling system comprising:

an inertial separator configured to separate particles from the cooling gas, and a flow regulation device that fluidly communicates with at least a first hole of the inertial separator to receive the cooling g as without contacting the inertial separator and configured to regulate the cooling gas, wherein the flow regulation device is disposed adjacent to the inertial separator within a wall of the casing;

wherein the flow regulation device is removable from the compressor using at least one flange and comprises:

a first ring element having a second hole and being configured to be attached to a first end of the flow regulation device; and a second ring element having a third hole and being configured to be attached to a second end of the flow regulation device.

9. The system of claim 8, wherein parts of the inertial separator the flow regulation device are provided within the wall of the casing such that holes formed in the parts fluidly communicate to each other.

10. The system of claim 8, wherein the flow regulation device has a first end region that is attached to the casing and a second end region that faces the inertial separator without contacting the inertial separator and a chamber is formed within the wall of the casing between inertial separator and the flow regulation device.

11. The system of claim 10, wherein the chamber is sealed by the inertial separator and the flow regulation device such that most of the cooling gas is not leaked.

12. The system of claim 8, wherein the inertial separator is provided in a first aperture in the casing and the flow regulation device is provided in a second aperture in the casing such that the inertial separator does not contact the flow regulation device.

13. The system of claim 8, wherein the first hole fluidly communicates with one or more holes of the inertial separator to receive the cooling gas, the second hole directs a part of the cooling gas to the bearings of the compressor and the third hole directs a remaining part of the cooling gas to a motor.

14. The system of claim 13, wherein a diameter of the second hole is different from a diameter of the third hole.

* * * * *